March 15, 1927.  L. VON REIS  1,621,144
METHOD AND DEVICE FOR MANUFACTURING PLATE GLASS
Filed April 28, 1926
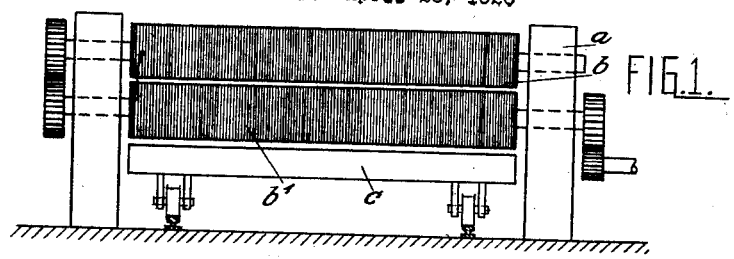
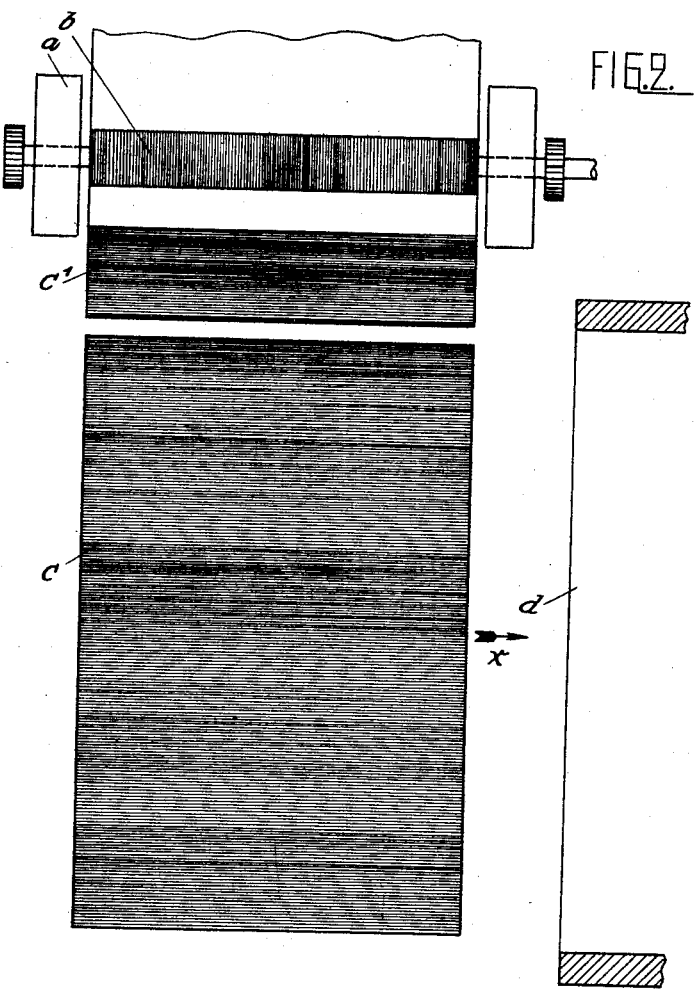
Inventor:
Lambert von Reis Patented Mar. 15, 1927.

1,621,144

UNITED STATES PATENT OFFICE.

LAMBERT VON REIS, OF HERZOGENRATH, GERMANY.

METHOD AND DEVICE FOR MANUFACTURING PLATE GLASS.

Application filed April 28, 1926, Serial No. 105,320, and in Germany June 11, 1925.

This invention relates to the manufacture of plate glass and, more particularly, to the rolling of large glass plates by means of a rolling machine comprising a plurality of rolls.

As is well-known, the glass plates made according to the old methods possess more or less numerous surface defects such as dents, cold flaws and cracks produced by the quenching of the hot glass mass when it comes into contact with the surfaces of the iron rolls which have a lower temperature.

According to the invention, the glass plates are rolled on the glass rolling machine with flutes on one or both of their surfaces. Tests made in actual practice have proved that the above-mentioned surface defects disappear entirely if the surfaces of the glass plate are fluted. The flutes on the plate surfaces may be produced by using fluted rolls. The new method is of particular advantage in the manufacture of large glass plates produced on glass rolling machines in one turn from the whole contents of a large melting pot. In the manufacture of such large-sized glass plates, the glass mass possesses already during the rolling operation a relatively great stiffness so that there does not exist any danger of the glass mass clinging in the flutes of the rolls. The effect of the flutes is as follows: Owing to the viscous nature of the glass mass the same does not fill the flutes in their full depth, but it fills only the outer portions of the flutes so that air remains in the latter and forms an insulating layer which considerably reduces the surface of contact between the glass and the rolls. The result thereof is that, on the one hand, the danger of quenching and the consequent formation of dents on the surface of the glass plate are reduced. In order to accomplish the purpose, it is sufficient for the flutes to have a depth of only some tenths of a millimeter. The flutes make the surface of the glass plate smoother in the sense that, although a defect of some few tenths of a millimeter is intentionally inflicted upon the plate, defects of about 1 to 1½ millimeters mostly entailed in the known methods are avoided. On the other hand, the parts of the glass mass which have entered the flutes, solidify at once and form a frame by which the glass surface is stayed and protected against subsequent deformations. Another advantage of the ribs or flutes on the surfaces of the glass plates resides in that in carrying the glass by means of conveying tables to the annealing kiln the ribs offer only a small surface of contact to the tables so that the transmission of heat from the glass to the tables is reduced. This advantage may even be increased by providing also the surface of the conveying tables with suitable flutes which preferably extend transversely or obliquely to the flutes of the glass plates in such a manner that a contact between the glass and the table takes place only at the points of intersection of the respective ribs, whereby a further reduction of the heat transmission is attained so that the glass can be brought into the annealing kiln at a higher temperature than has hitherto been possible.

An embodiment of the device for carrying out the present method is illustrated in the accompanying drawing in which:

Fig. 1 is a front elevation of a glass rolling machine and a glass plate conveying table, Fig. 2 is a plan view of the rolling machine and two conveying tables in combination with a fragmentary section of an annealing kiln.

$a$ is the frame of a glass rolling machine comprising two superimposed rolls $b$ and $b^1$ which have fluted surfaces in accordance with the invention. $c$ and $c^1$ are travelling tables designed to receive the rolled glass plates and carry them to the annealing kiln which is designated by $d$. The table $c$ has its entire surface fluted, while the table $c^1$ has only a part of its surface fluted. In the embodiment illustrated the flutes of the tables extend transversely of the flutes of the rolls.

In rolling out the glass mass on the rolling machine the rolls $b$ $b^1$ produce plates which are fluted on both sides. Upon leaving the rolling machine the rolled glass plates are deposited on the tables $c$, $c^1$ which are advanced in accordance with the progress of the rolling operation and then moved forward until they reach the opening of the annealing kiln $d$. After having reached this point, the glass plates are shifted from the tables into the kiln in the direction of the arrow $x$, Fig. 2. While resting on the tables, only a small surface of contact formed by the crossing ribs or flutes exists between the glass plates and the table. Therefore the delivery of heat from the glass to the conveying tables is restricted to a minimum.

As the ribs or flutes of the conveying tables extend in the direction of the arrow $x$, Fig. 2, the shifting of the plates from the tables into the annealing kiln is facilitated by these ribs inasmuch as the same guide the plates and hold them in the shifting direction.

Having thus described my invention, what I claim as new and desire to secure by Letters Patent is:—

1. The method of manufacturing plate glass, which consists in rolling the glass mass into plates with flutes on at least one of their surfaces, depositing the plates with a fluted surface on a conveyor having a supporting face provided with flutes in a direction different from the direction of the flutes on the glass plates, and carrying the latter by means of the conveyor to an annealing kiln.

2. A device for manufacturing plate glass, comprising a rolling machine including at least one roll provided with flutes in one direction, and travelling glass plate receiving and conveying tables having their top surfaces provided with flutes in another direction.

3. A method of manufacturing plate glass which consists in rolling the glass with a series of flutes to reduce the surface contact area thereof and depositing the glass upon a conveyor having the area of its contact surface reduced whereby the plate has a minimum contact with the conveyor to avoid undue loss of heat in the plate while on the conveyor.

4. A device for manufacturing plate glass comprising a machine for rolling the glass into plate form and simultaneously forming uni-directional flutes therein and a table having its contact surface materially reduced in area to receive the fluted side of the glass plate to thereby minimize the contact area between the plate and conveyor to reduce the loss of heat from the plate incident to such contact.

5. A device for manufacturing plate glass comprising a rolling machine for forming the plates and simultaneously forming in one surface a series of comparatively minute flutes and a conveyor having corresponding flutes to receive the fluted surface of the plate glass, the flutes of the glass and conveyor being non-registering.

In testimony whereof I have signed my name to this specification.

LAMBERT von REIS.